June 20, 1950     M. HOFFMAN     2,512,527

BODY PROTECTOR FOR AUTOMOBILES

Filed Aug. 2, 1948

INVENTOR.
MAX HOFFMAN
BY HIS ATTORNEYS.
HARRIS, KIECH, FOSTER & HARRIS

Patented June 20, 1950

2,512,527

UNITED STATES PATENT OFFICE 2,512,527

BODY PROTECTOR FOR AUTOMOBILES

Max Hoffman, Los Angeles, Calif.

Application August 2, 1948, Serial No. 41,952

10 Claims. (Cl. 293—62)

This invention relates to body protectors for a vehicle and, more particularly, to a body protector which is of an extensible-retractible nature and which is adapted to be utilized to protect the hitherto unprotected sides of the body of the vehicle.

Recent design changes in automobile bodies have eliminated entirely the conventional running board which was previously an integral part of the body design and the body now extends the full width of the automobile and entirely encloses the chassis of the vehicle. The old-style running board, in addition to functioning as a step which a person entering the vehicle could utilize to good advantage, also served to absorb minor blows which resulted from accidents essentially trivial in nature. Thus, the main body portion of the vehicle along the sides thereof was shielded, to a certain extent, by the incorporation therealong of the running board structure.

As indicated above, the most recent body designs have entirely eliminated this external running board structure and the side of the body of the automobile extends down in a flush panel and door arrangement to a point within a short distance of the ground. Therefore, the slightest of accidents is apt to result in considerable damage to the finish and the configuration of the body itself.

It is, therefore, a primary object of my invention to provide a body protector which is adapted to be utilized to protect the lower portions of the sides of vehicle bodies from damage by trivial collisions and accidents.

At the present time, no provision is made for protecting the sides of the newly designed bodies from injury and it is possibly so because of the difficulty of providing any means which would serve to effectively ward off the impact occasioned by minor collisions with other vehicles since it would necessarily have to run across the entire lower edge of each side of the body. Since the door structures in the new style bodies extend downwardly to the lower edge of the body, it is obvious that any protective means which would be placed in position to ward off trivial collision impacts would have to be of such a nature that it would not impede the opening and the closing of the doors. Some attempts have been made to provide for this type of structure by providing a simple garnish molding along the lower edge of the body but such moldings obviously are not very effective in reducing the damage resulting from side collisions.

A further object of my invention is to provide a body protector for the sides of vehicles which is of an extensible-retractible nature and which can be lowered under the chassis of the automobile to permit the opening and closing of the doors of the vehicle and to facilitate the ingress and egress of passengers.

Another object of my invention is the provision of a protective device for a vehicle which includes two elongated bumper structures extending longitudinally of the lower sides of the body adapted to preserve both the body and the door structures incorporated therein from substantial damage which frequently is occasioned by relatively trivial collisions due to the completely exposed nature of the side portions of the body.

Since the sides of the body structure and the doors incorporated therein are susceptible to damage from even the most trivial of collisions and since such damage frequently results in the distorting of the door frames and the consequent imprisonment of the occupants of the vehicle therein until assistance can be rendered, it is desirable to provide a protective device for such bodies which will serve to ward off any impact produced by side collision with other vehicles.

It is an additional object of my invention to provide a protective device for automobile bodies which extends longitudinally of the body of the vehicle and which is of sufficient length to provide a means of warding off impact with the door structures incorporated in the body and which thus eliminates the possibility that the impact may distort the door structures and imprison the occupants of the vehicle in the body of the vehicle.

A further object of my invention is the provision of a retractible-extensible body protector device for automobiles which includes a power means adapted to be actuated from the driver's seat and which thus facilitates the lowering and the raising of the bumpers incorporated in the device by the driver of the vehicle.

It is an additional object of my invention to provide a body protector for automobiles which can be easily and cheaply manufactured and which can be readily installed upon automobiles which are in use at the present time. It is also an object of my invention to provide a device of the the aforementioned type which can be factory installed as a standard equipment item and can be sold at a moderate price.

Other objects and advantages of my invention will become apparent from a perusal of the following specification and the accompanying drawing which is for the purpose of illustration only, and in which.

Figure 1:
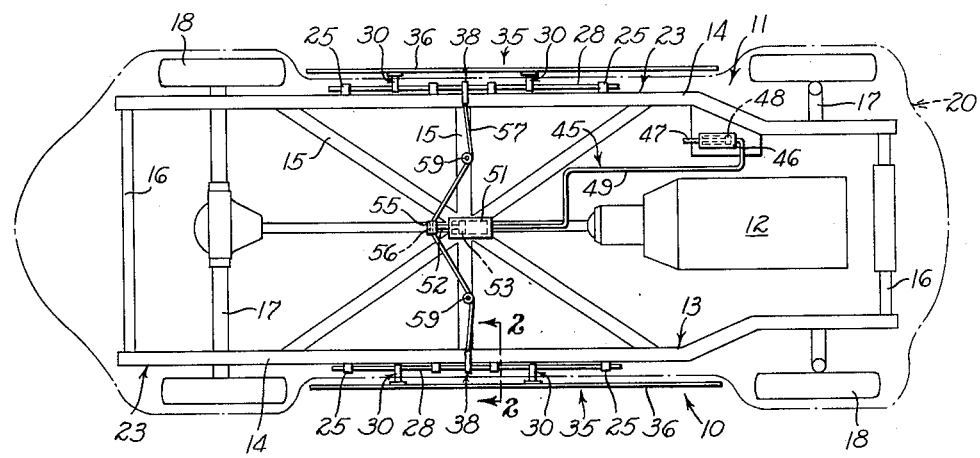
Fig. 1 is a top plan view showing my invention incorporated in an automobile.

There is illustrated in the drawing a vehicle 10 which is exemplified as an automobile including a chassis 11 which incorporates a power plant 12 and a frame 13. The frame 13 of the vehicle 10 is conventionally formed of steel members and includes two longitudinal side members 14 which are arranged in operative relationship with each other through the medium of end members 16 and reinforced by means of cross members 15. Mounted in a conventional way upon the members of the frame 13 are axles 17 upon which are suspended tractive and steering wheels 18. Although a specific chassis structure is shown to illustrate the manner in which the invention can be incorporated in a vehicle of conventional type, it is, of course, not intended that the application of the invention be limited to a vehicle having a chassis or a body of a specific design and it should be understood that the chassis and body shown are utilized merely for the purpose of illustrating the manner of construction and mode of operation of the invention.

Positioned upon the frame 13 and securely affixed thereto in a manner not shown is a body 20 of new design in which the sides 21 of the body have their lower portions 22 extending in a smooth contour down to the extreme lower edge of the body and in which no running boards of the conventional type are disposed on the exterior of the body. The outline of the body is shown in dotted lines in Fig. 1 and the configuration of one side 21 and the lower portion 22 of the side 21 is shown in dotted lines in Fig. 2 of the drawing.

The longitudinal side members 14 of the frame 13 are constituted, in the vehicle under discussion, by channel sections 23 which have their sides 24 arranged in a plane normal to the plane of the longitudinal axis of the frame 13. Since the construction of the protective device on both sides of the vehicle is identical in nature, the construction of one side of the apparatus alone will be described. Mounted upon the side 24 of the channel section 23 is a plurality of bearing bosses 25 which are affixed to the side 24 through the medium of rivets 26 or any similar suitable fasteners. Formed in the bearing bosses 25 are longitudinally disposed holes 27 which are adapted to receive an elongated cylindrical support rod 28 for rotation therein. The support rod 28 extends along the longitudinal side member 14 and is supported thereupon by the plurality of bearing bosses 25, which are arranged at spaced intervals upon the longitudinal side members 14.

Mounted upon and adapted to be rotated by the support rod 28 are a number of support arms 30 which have enlarged rearward ends 31 through which are formed longitudinally directed openings 32 adapted to permit their mounting in a fixed and predetermined attitude upon the support rod 28. As can be readily discerned from the drawing, the support arms 30 are mounted upon the support rod 28 and are adapted to be rotated thereby and therewith in an arc through a plane which is substantially normal to the longitudinal axis of the support rod 28 and the longitudinal side member 14 upon which it is mounted. The forward ends of the support arms 30 have secured thereto or integrally formed therewith mounting plates 33 which are generally rectangular in configuration and are slightly arcuate in their lengthwise dimension. A number of spaced openings in the plates 33 are adapted to receive the shanks of rivets 34, or similar fasteners, which secure to the faces of the mounting plates 33 a longitudinally elongated bumper 35 which is constituted, in the present embodiment of the invention, by an elongated slightly resilient strip of metal 36 which is formed on an arc which extends vertically of its longitudinal dimension, said arc being adapted to register with the arc of the mounting plates 33 and to permit the accurate mounting of the bumper 35 thereupon.

Figure 2:
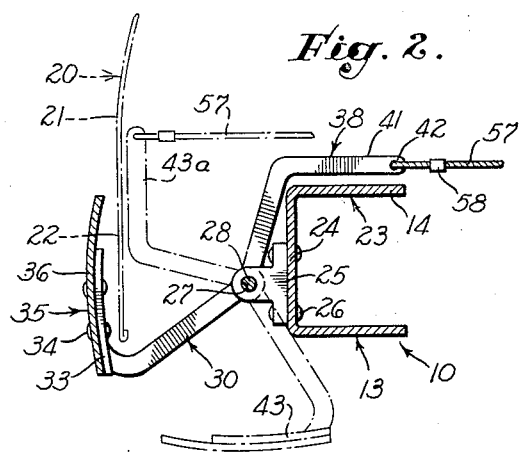
Fig. 2 is an enlarged, transverse sectional view taken on broken line 2—2 of Fig. 1.
Figure 3:
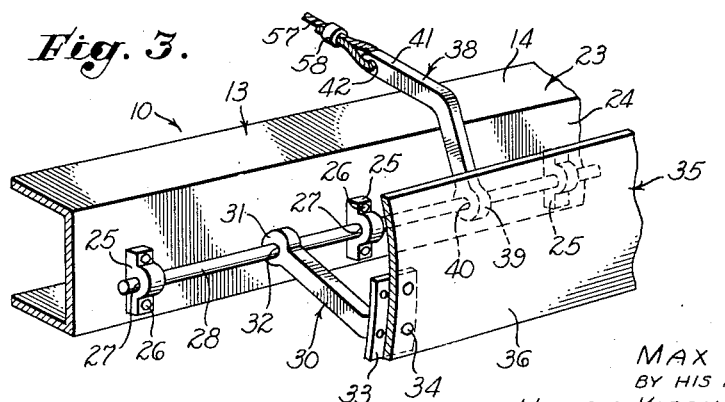
Fig. 3 is a perspective view of my invention in its extended position.

As may be best seen in Fig. 2 of the drawing, the bumper 35 is adapted to be rotated upon the support arms 30 through the medium of the support rod 28 from a first, retracted position underlying the chassis 11, which is indicated in Fig. 2 by the dotted line 43, into a second, extended position in which it overlies the lower portion 22 of the side 21 of the body 20, thus serving to protect that portion of the body from damage resulting from minor collisions. It is intended that the driver of the vehicle extend the bumper 35 into the second or extended position after he has entered the vehicle through suitable power means which will be described below and it is also intended that he retract the bumper 35 into its first retracted position, in which it underlies the chassis 11, before he attempts to leave the vehicle. It is conceivable that an indicator which might be actuated by the bumper 35 and which is placed upon the dashboard could indicate to the driver of the vehicle that the bumper 35 was in the extended position and thus warn him to retract the bumper 35 before attempting to leave the vehicle.

Mounted upon the support rod 28 intermediate the ends thereof and adapted to rotate the support rod 28 and the associated bumper 35 in reference to the frame 13 of the vehicle is a crank arm 38 which has a lower enlarged portion 39 provided with a hole 40 which encircles the peripheral area of the support rod 28 and is securely swaged or otherwise fixedly attached thereto in order that the travel of the crank arm 38 in a plane lying substantially normal to the longitudinal axis of the side member 14 of the frame 13 will cause the rotation of the support rod 28 and the concomitant rotation of the bumper 35 mounted upon the support rod 28. The upper end 41 of the crank arm 38 is provided with a hole 42 for a purpose which will be described in greater detail below.

Mounted upon the frame 13 of the chassis 11 is a power means, indicated generally at 45, and consisting of a first hydraulic cylinder 46 which is so juxtaposed to the position assumed by the driver when he is seated in the vehicle that it can be readily operated by him through a pedal means, not shown, or any other similar expedient. The first hydraulic cylinder 46 includes a piston rod 47 which has affixed thereon a piston 48 which is adapted upon the movement of the piston rod 47 in the cylinder 46 to drive before it a column of hydraulic fluid through a hydraulic line 49 which is suitably connected to a second hydraulic cylinder 51 mounted upon the frame 13 of the vehicle 10.

The second hydraulic cylinder 51 is securely mounted upon one of the cross members 15 and lies between the bumpers 35 which constitute the body protectors of the present invention. The second hydraulic cylinder 51 is provided with a piston rod 52 which has mounted thereupon a piston 53 which is adapted to be shifted by the flow of hydraulic fluid through the hydraulic line 49 as induced by the concomitant movement of the piston 48 in the first hydraulic cylinder 46. Thus, the actuation of the first hydraulic cylinder 46 by the driver of the vehicle will cause a simultaneous and proportional actuation of the second hydraulic cylinder 51. Mounted upon the end of the piston rod 52 of the second hydraulic cylinder 51 is a bearing block 55 which has a transverse hole 56 formed therein adapted to receive the intermediate portion of a cable 57 or other flexible member which has its opposite ends secured to the upper ends 41 of the crank arms 38 through the medium of collars 58 which are crimped about the looped opposite ends thereof. These portions of the cable 57 which lie between the points of attachment of the opposite ends of the cable to the upper ends of the crank arms 38 and the block 55 are trained through sheaves 59 which serve to properly direct the cable in transmitting the movement of the piston rod 52 to the crank arms 38.

When the driver of the vehicle enters the vehicle, the bumpers 35 will be in the retracted position in which they underlie the chassis 11 of the vehicle 10, as shown in Fig. 2. When the driver has entered the vehicle 10, he actuates the first hydraulic cylinder 46 by any suitable means and causes the piston rod 47 to carry the piston 48 in a direction which will force hydraulic fluid through the hydraulic line 49 and into the second hydraulic cylinder 51. The expansive force of the hydraulic fluid passing into the second hydraulic cylinder 51 will cause the piston 53 to shift the piston rod 52 longitudinally within the cylinder 51 and will cause a concomitant transposition of the bearing block 55. The bearing block 55 will carry with it the intermediate portion of the cable 57 and will draw in the opposite ends of the cable. The drawing-in of the opposite ends of the cable 57 will cause the upper ends 41 of the crank arms 38 to be drawn from the dotted line position 43a of Fig. 2 causing the rotation of the support rods 28. The rotation of the support rods 28 will cause the concomitant rotation in an arc of the support arms 30, thus carrying the bumpers 35 from their first retracted position into their second extended position in which they overlie the lower portions 22 of the sides 21 of the body 20 of the vehicle. When thus located in this extended position, the bumpers 35 serve to shield the lower portions 22 of the sides 21 of the body from damage resulting from slight accidents.

When the driver of the vehicle desires to leave it, he merely releases the pressure in the first hydraulic cylinder 46 and the weight of the bumpers 35 will cause them to sink into the retracted position in which they underlie the chassis 11 of the vehicle 10. Of course, it is conceivable that the other means of actuating the body protector other than that shown might be utilized and a positive mechanical linkage may be substituted for the hydraulic mechanism which is described.

I thus provide by my invention a body protector for vehicles having unprotected sides which includes two retractible-extensible bumper members which can be extended from a first retracted position into a second extended position when the vehicle is in use.

Although I have shown and described a specific embodiment of my invention, it is obvious that certain portions and elements thereof may be supplanted by similar portions and elements and I, therefore, do not intend my invention to be limited to such a specific showing but intend rather that it be afforded the full scope of the following claims.

I claim as my invention:

1. A protective device adapted to be utilized in conjunction with a vehicle having a chassis, said chassis including a frame incorporating a plurality of longitudinal side members extending substantially parallel to the path of travel of said vehicle, and a body mounted upon said frame including, in combination: an elongated, rotatable bumper, said bumper being adapted for rotation from a first retracted position under said chassis to a second extended position overlying the lower portion of said body; a plurality of bearing members secured to one of said longitudinal side members of said frame; rotatable support means mounted in said bearing members having said bumper mounted thereupon; and power means connected to said bumper incorporated in said chassis adapted to rotate said bumper upon said rotatable support means from said first retracted position under said chassis to said second extended position overlying the lower portion of said body.

2. A protective device adapted to be utilized in conjunction with a vehicle having a chassis, said chassis including a frame incorporating a plurality of longitudinal side members extending substantially parallel to the path of travel of said vehicle, and a body mounted upon said frame including, in combination: an elongated bumper; a plurality of bearing members secured to one of said longitudinal side members of said frame; an elongated support rod mounted for rotation in said bearing members; rotatable support means mounted on said support rod having said bumper mounted thereupon; and power means connected to said support rod incorporated in said chassis adapted to rotate said bumper upon said rotatable support means from a first retracted position under said chassis to a second extended position overlying the lower portion of said body.

3. A protective device adapted to be utilized in conjunction with a vehicle having a chassis, said chassis including a frame incorporating a plurality of longitudinal side members extending substantially parallel to the path of travel of said vehicle, and a body mounted upon said frame including, in combination: an elongated bumper; a plurality of bearing members secured to one of said longitudinal side members of said frame; an elongated support rod mounted for rotation in said bearing members; rotatable support means mounted on said support rod having said bumper mounted thereupon; a crank arm affixed to said support rod intermediate its length; and power means connected to said crank arm and incorporated in said chassis adapted to rotate said bumper upon said rotatable support means from a first retracted position under said chassis to a second extended position overlying the lower portion of said body.

4. A protective device adapted to be utilized in conjunction with a vehicle having a chassis, said chassis including a frame incorporating a plurality of longitudinal side members extending substantially parallel to the path of travel of said vehicle, and a body mounted upon said frame including, in combination: an elongated bumper;

a plurality of bearing members secured to one of said longitudinal side members of said frame; an elongated support rod disposed in substantial parallelism to said longitudinal side member; rotatable support means mounted on said support rod having said bumper mounted thereupon; and power means connected to said support rod and incorporated in said chassis adapted to rotate said bumper upon said rotatable support means from a first retracted position under said chassis to a second extended position overlying the lower portion of said body.

5. A protective device adapted to be utilized in conjunction with a vehicle having a chassis, said chassis including a frame incorporating a plurality of longitudinal side members extending substantially parallel to the path of travel of said vehicle, and a body mounted upon said frame including, in combination: an elongated bumper; a plurality of bearing members secured to one of said longitudinal side members of said frame; an elongated support rod disposed in substantial parallelism to said longitudinal side member; rotatable support means mounted on said support rod having said bumper mounted thereupon; a crank arm affixed to said support rod intermediate its length and adapted to be moved in an arcuate path in a plane substantially normal to the axis of said rod; and power means connected to said crank arm and incorporated in said chassis adapted to rotate said bumper upon said rotatable support means from a first retracted position under said chassis to a second extended position overlying the lower portion of said body.

6. A protective apparatus adapted to be utilized in conjunction with a vehicle having a chassis including a frame incorporating a plurality of longitudinal side members extending substantially parallel to the path of travel of said vehicle, and a body mounted upon said frame including, in combination: a first elongated, rotatable bumper and a second elongated, rotatable bumper, said first elongated bumper being rotatably mounted upon one of said longitudinal side members for rotation in an arc whose plane is normal to the longitudinal axis of said side member and said second elongated bumper being mounted opposite said first bumper on another of said longitudinal side members for rotation in an arc whose plane is normal to the longitudinal axis at said side member; and power means mounted upon said chassis and attached to said rotatable bumpers adapted to rotate them in said arcs from a first, retracted position in which they underlie said chassis to a second, extended position in which they overlie the lower portion of said body.

7. An apparatus as defined in claim 6 in which said first and second bumpers are rotatably supported on bearings secured to said longitudinal side members, said bearings having journalled therein longitudinal support rods which, in turn, have affixed thereto support arms on which said bumpers are mounted.

8. An apparatus as defined in claim 7 in which crank arms mounted upon said support rods provide the intermediary through which the movement of said power means is transmitted to said bumpers.

9. An apparatus as defined in claim 6 in which said power means includes a primary hydraulic cylinder and a remotely disposed secondary hydraulic cylinder connected to said primary cylinder, said cylinders being mounted on said chassis and said secondary cylinder being adapted to transfer the movement of said primary cylinder to said bumpers.

10. An apparatus as defined in claim 9 in which said power means includes a cable adapted to be connected at opposite ends to said bumpers and to said secondary hydraulic cylinder intermediate said opposite ends.

MAX HOFFMAN.

REFERENCES CITED

The following references are of record in the file of this patent:

UNITED STATES PATENTS

| Number | Name | Date |
|---|---|---|
| 968,800 | Randerson | Aug. 30, 1910 |
| 1,415,518 | Buck | May 9, 1922 |
| 1,596,903 | Thwaits | Aug. 24, 1926 |
| 1,708,804 | Schulman | Apr. 7, 1929 |